United States Patent
Hladký et al.

(10) Patent No.: US 11,263,797 B2
(45) Date of Patent: Mar. 1, 2022

(54) REAL-TIME POTENTIALLY VISIBLE SET FOR STREAMING RENDERING

(71) Applicant: MAX-PLANCK-GESELLSCHAFT ZUR FÖRDERUNG D. WISSENSCHAFTEN E.V., Munich (DE)

(72) Inventors: Jozef Hladký, Saarbrücken (DE); Markus Steinberger, Graz (AT); Hans-Peter Seidel, St. Ingbert (DE)

(73) Assignee: Max-Planck-Gesellschaft zur Förderung der Wissenschaften e. V., Munich (DE)

( * ) Notice: Subject to any disclaimer, the term of this patent is extended or adjusted under 35 U.S.C. 154(b) by 0 days.

(21) Appl. No.: 16/859,315

(22) Filed: Apr. 27, 2020

(65) Prior Publication Data

US 2020/0327713 A1 Oct. 15, 2020

Related U.S. Application Data

(63) Continuation of application No. PCT/EP2017/078087, filed on Nov. 2, 2017.

(51) Int. Cl.
*G06T 15/00* (2011.01)
*G06T 15/20* (2011.01)
*G06T 17/20* (2006.01)
*H04L 67/131* (2022.01)

(52) U.S. Cl.
CPC .......... *G06T 15/005* (2013.01); *G06T 15/205* (2013.01); *G06T 17/20* (2013.01); *H04L 67/38* (2013.01)

(58) Field of Classification Search
None
See application file for complete search history.

(56) References Cited

U.S. PATENT DOCUMENTS

| | | | |
|---|---|---|---|
| 6,525,731 B1* | 2/2003 | Suits | G06T 15/04 345/421 |
| 2005/0256950 A1* | 11/2005 | Suzuki | G06T 19/00 709/223 |
| 2013/0300740 A1* | 11/2013 | Snyder | G06F 3/016 345/420 |
| 2015/0015789 A1* | 1/2015 | Guntur | H04N 21/2365 348/581 |
| 2016/0284123 A1* | 9/2016 | Hare | G06T 7/55 |
| 2016/0300385 A1* | 10/2016 | Bell | G06T 3/40 |

(Continued)

OTHER PUBLICATIONS

Javier Lluch et al, "Interactive three-dimensional rendering on mobile computer devices", Proc. 2005 ACM SIGCHI International Conf. on Advances in Computer Entertainment Technology , ACE '05, ACM Press, NY, NY, USA Jun. 5, 2005, pp. 254-257, XP058346479.

(Continued)

*Primary Examiner* — Michelle Chin
(74) *Attorney, Agent, or Firm* — Siritzky Law, PLLC

(57) ABSTRACT

The invention relates to a method for transmitting 3D model data, the 3D model data comprising polygons, from a server to a client for rendering, the method comprising: obtaining the 3D model data by the server; and transmitting the 3D model data from the server to the client. According to the invention, the 3D model data is obtained by the server, based on a given multitude of possible views.

20 Claims, 8 Drawing Sheets

(56) References Cited

U.S. PATENT DOCUMENTS

2017/0018121 A1    1/2017  Lawson et al.
2017/0178400 A1*   6/2017  Boulkenafed ........... G06T 17/00

OTHER PUBLICATIONS

WIPO, International Preliminary Report on Patentability Chapter I for PCT/EP2017/078087, dated May 5, 2020 (10p.).
WIPO, International Search Report for PCT/EP2017/078087, dated Sep. 5, 2019 (5p.).
WIPO, Written Opinion of the International Searching Authority for PCT/EP2017/078087, dated Sep. 5, 2019 (9p.).
Jozef Hladký et al "The Camera Offset Space: Real-time Potentially Visible Set Computations for Streaming Rendering" ACM Transactions on Graphics (Proc. SIGGRAPH Asia 2019), Nov. 2019, Brisbane, Australia.
EPO, Amended claims filed after receipt of (European) search report, in EP 17 794 311.5, filed by Applicant Feb. 6, 2020.

* cited by examiner

Server

Client

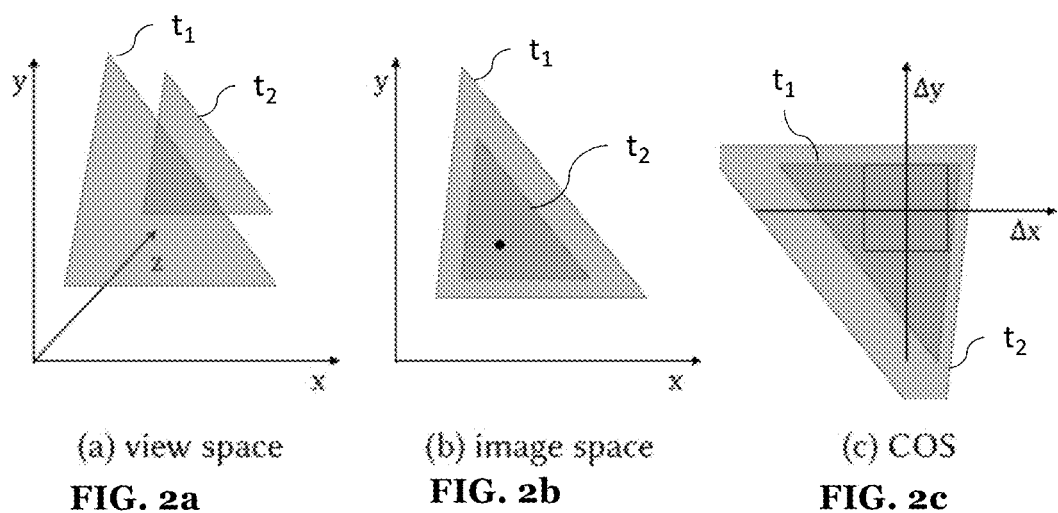
(a) view space
FIG. 2a
(b) image space
FIG. 2b
(c) COS
FIG. 2c
Figure 3
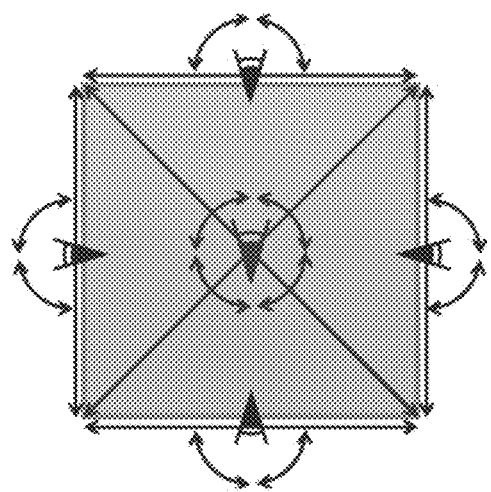

Figure 4
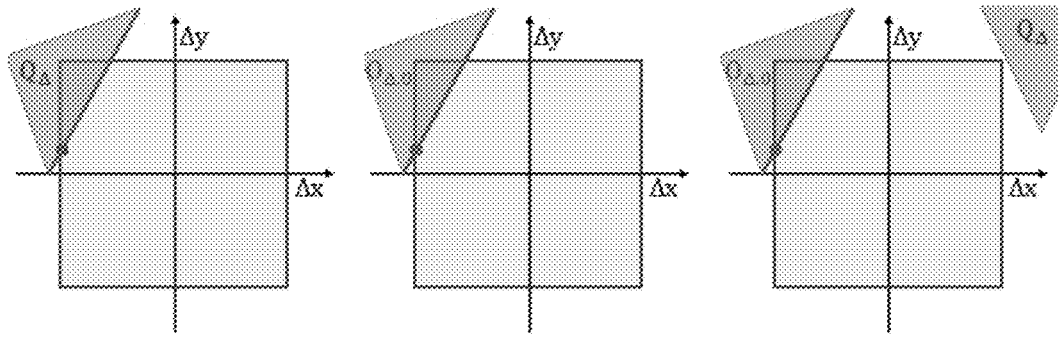
(a) A first triangle is transferred to COS...
(b) ...and kept as potential occluder.
(c) Outside triangles are immediately discarded.
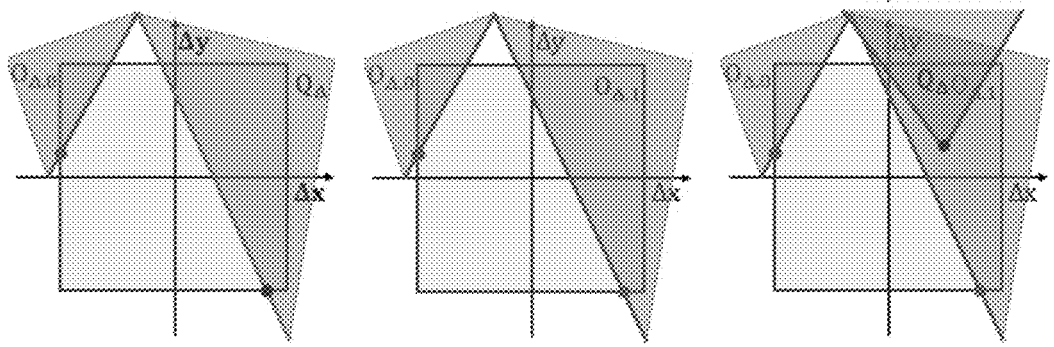
(d) Another triangle is processed...
(e) ...and forms a second occluder.
(f) The next triangle is invisible (case b).
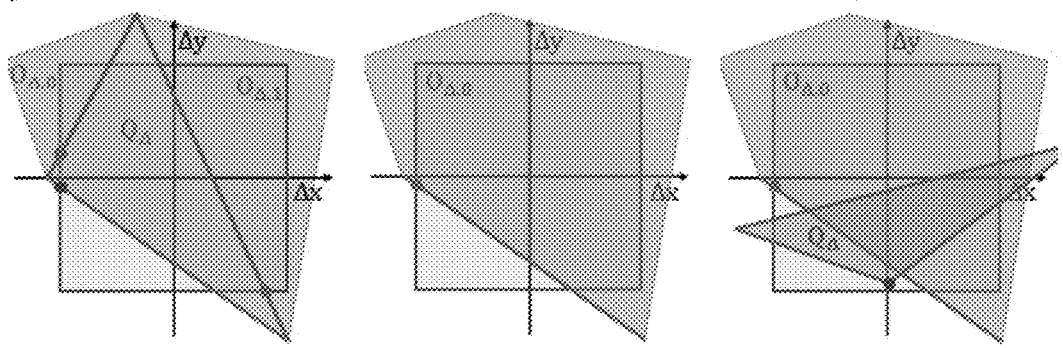
(g) A triangle sharing two edges...
(h) ...fuses the occluders into a large occluder.
(i) Triangles intersecting the silhouette are kept.

```
Algorithm 1: Progressive Visibility Resolution
 1  Occluders ← ∅
 2  for Q ∈ TriangleList do
 3      Q_Δ ← computeCOS (Q, s)
 4      for i ← 0 to 3 do
 5          if intersect(Q_Δ.edge(i), rectangle(C_Δ)) then
 6              Q_Δ.edge(i) ← CROSSING
 7          else if outside(Q_Δ.point(i), C_Δ) then
 8              Q_Δ.edge(i) ← INACTIVE
 9      if Q_Δ.edge(0...2) = INACTIVE and Q_Δ ∩ 0 = ∅ then
10          continue
11      Q_Δ.refs(0...2) ← choosePointsIn(Q_Δ ∩ C_Δ)
12      Q_Δ.d ← depthEquation(Q_Δ, s)
13      Qvisible ← true
14      for Occluder ∈ Occluders and Qvisible do
15          if ¬Occluder.coverall then
16              if any(Occluder.refs ∈ Q_Δ) then continue
17              Overlap ← ∅
18              for T_Δ ∈ Occluder and Overlap = ∅ do
19                  for (e_{Q_Δ}, e_{T_Δ}) ∈ Q_Δ.edge × T_Δ.edge do
20                      if e_{Q_Δ} or e_{T_Δ} = INACTIVE then
21                          continue
22                      if e_{Q_Δ} = e_{T_Δ} then
23                          Merging ← Merging ∪ (e_{Q_Δ}, e_{T_Δ})
24                          continue
25                      i ← intersect(e_{Q_Δ}, e_{T_Δ})
26                      if i ≠ ∅ and i ∩ C_Δ ≠ ∅ then
27                          Overlap ← (e_{Q_Δ}, e_{T_Δ})
28                          break 2
29              if Overlap ≠ ∅ then
30                  continue
31          for T_Δ ∈ Occluder do
32              if r ∈ T_Δ | r ∈ Q_Δ.refs then
33                  if depth(T_Δ.d, r) < depth(Q_Δ.d, r) then
34                      Qvisible ← false
35                      break
36      if Qvisible then
37          if Merging ≠ ∅ then
38              fuseOccluder(Merging)
39              setEdgesInactive(Merging)
40          else
41              Occluders ← Occluders ∪ Q_Δ
42          actives ← {e | e ∈ edges(Occluder) ∧ e ≠ INACTIVE}
43          if actives = ∅ then
44              Occluder.coverall ← true
45          else
46              Occluder.refs ← choosePointsIn(actives ∩ C_Δ)
47  return triangles(Occluders)
```

| Resolution (pixels) | C (cm) | Enlargement (ms) | Binning (ms) | Sorting (ms) | Visibility (ms) | Compaction (ms) | Captured (M) | Resolved | list min / max / avg | Output (%) |
|---|---|---|---|---|---|---|---|---|---|---|
| 400x200 | 10.00 | 10.50 | 0.05 | 55.32 | 348.78 | 0.74 | 4.9 | 577k | 1 / 14592 / 103.0 | 33.38 |
| 400x200 | 5.00 | 10.43 | 0.05 | 42.16 | 239.36 | 0.67 | 3.2 | 594k | 1 / 14848 / 71.14 | 28.62 |
| 800x400 | 10.00 | 10.67 | 0.17 | 69.11 | 738.49 | 0.90 | 11.6 | 487k | 1 / 14592 / 64.38 | 42.30 |
| 800x400 | 5.00 | 10.67 | 0.16 | 37.18 | 503.94 | 0.80 | 7.6 | 579k | 1 / 12288 / 43.83 | 34.11 |

REAL-TIME POTENTIALLY VISIBLE SET FOR STREAMING RENDERING

RELATED APPLICATION

This application is a continuation of PCT/EP2017/078087, filed Nov. 2, 2017, the entire contents of which are hereby fully incorporated herein by reference for all purposes.

The present invention relates to methods and devices for streaming rendering.

INTRODUCTION

Real-time graphics demand ever-increasing processing power. The recent boom in virtual reality (VR) has amplified this demand. In order to provide an immersive experience in VR, while using a head-mounted display (HMD), an application must provide high visual fidelity at very high framerates in high resolutions for both eyes. Even most current high-end graphics processing units (GPUs) cannot fulfill this demand.

Although tethered HMD systems support high quality graphics and responsiveness when connected to a high-end computer, a fluent user experience requires an approach for avoiding visual judder. Asynchronous SpaceWarp [https://developer.oculus.com/blog/asynchronous-spacewarp/] is a technique, which updates the current frame at presentation time transforming the last depth and color buffer according to the recent head movement, in order to mask small movements and make the user experience more fluent. However, this technique is only correct for rotations, suffers quality loss if the image is not significantly oversampled, and disocclusions due to translational movements introduce tearing artifacts.

A concurrent trend evolves around using readily available mobile devices, such as mobile phones, directly as untethered HMDs. While computing rendering directly on the HMD has advantages, such as the availability of sensor data, the rendering power provided by mobile chips is insufficient for high quality content. It is improbable that mobile GPUs will get on par with desktop GPUs due to thermal dissipation constraints and limited battery power. As a remedy, untethered HMDs can be combined with a remote server, e.g., in a cloud or a Wi-Fi connected desktop computer, as rendering device. However, Wi-Fi connections increase the rendering latency by up to 100 ms, and wide-area connection up to 200 ms. In the interest of increasing mobility by removing wired connections and keeping the cost for gaming systems low, various methods for reducing the negative effects of such high latencies during remote rendering have been proposed.

Independent of the exact scenario, in which a powerful server is set up and where another device, i.e. a client, is used for display, the previously proposed systems employ similar concepts. At the core, they use image-based rendering techniques as outlined by a recent survey [Shu Shi and Cheng-Hsin Hsu. 2015. A Survey of Interactive Remote Rendering Systems. ACM Comput. Surv. 47, 4, Article 57 (May 2015), 29 pages. h.ps://doi.org/10.1145/2719921]: The server delivers any number of images created for a previous view, a speculated new view, or a close-by view to the client; the client picks one ore multiple views and warps them according to the intermediate camera movement. Depending on the warping technique, the generated new view can take depth information and disocclusion into account and can even speculatively fill up uncovered scene areas with imagined content.

Image-based methods always come with the drawback that high frequency information and fine scene structures alongside large depth discontinuities pose issues that are hard to overcome. While high frequency content that is undersampled during normal rendering will "only" result in aliasing artifacts, warping techniques will significantly make these issues worse, as they reproject already underrepresented information onto a new sampling grid. Furthermore, when transmitting or recovering depth information, a low number of samples for objects will lead to disconnected parts after reprojection. Similarly, when large depth continuities are present in scenes, the disoccluded regions will often result in clearly visible artifacts.

It is therefore an object of the invention to propose methods and devices that provide high quality streaming rendering in real-time.

This object is achieved by the methods and devices according to the independent claims. Advantageous embodiments are defined in the dependent claims.

According to one aspect of the invention, it is proposed to switch from an image-based approach to a forward rendering technique of 3D data on the client. Instead of warping pixels from a previous frame, the client simply renders polygons, e.g. triangles, much like a traditional rendering system.

To alleviate the rendering load on the client, the triangle data is preprocessed and shaded on the server and only those polygons potentially needed for rendering must be delivered to the client before they are needed.

To this end, the invention introduces a camera offset space, which for a given point or sample location on the image plane provides information under which camera offset the point is covered by a given polygon. Constructing the camera offset space for every pixel location, it is shown how the entire PVS for a rasterized image can be computed for translational camera movement. Elevating the camera offset space by another two dimensions, it is shown how it can be used to compute the PVS for arbitrary sample locations and rotational camera movement. An implementation of the complete PVS computation for current GPUs is provided using a combination of rendering pipeline stages and compute mode execution.

Compared to the prior art, the inventive approach does not have any issues with disocclusions, as the complete PVS is transmitted to the client. Rendering on the client does not involve complex geometry construction from the depth buffer, stepping through depth images, or the requirement of proxy geometry. The PVS is simply rendered in terms of polygons with depth buffering.

BRIEF DESCRIPTION OF THE DRAWINGS

These and other aspects of the invention will become more apparent when studying the following detailed description, in connection with the drawing, in which

FIGS. 2a-2c show examples for some triangle constellations and camera offset space constellations.

FIG. 3 shows how the potentially visible set for a 3D region (view from above), can be computed by 2D regions for all sides, with reduced rotation angles.

FIG. 4 shows example steps of the proposed progressive visibility resolution algorithm.

FIG. 5 shows, in pseudocode, a method for progressive visibility resolution according to an embodiment of the invention, with example steps for some triangles in FIG. 4.

FIG. 9 is a table showing the size of the PVS, the computation times for the individual steps and bin distributions for a test scene.

DETAILED DESCRIPTION

Figure 1A:
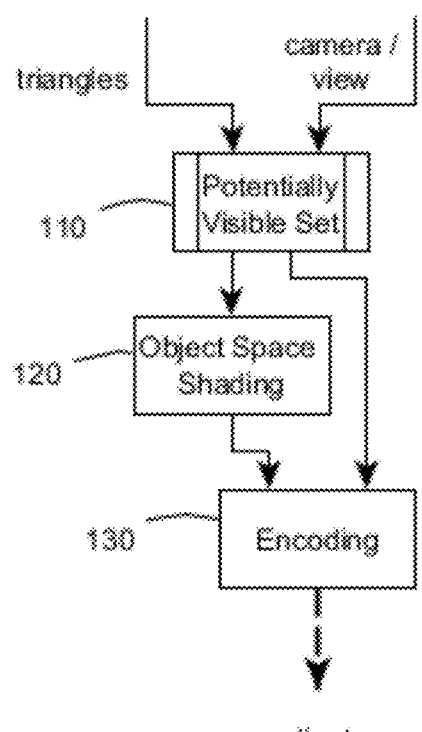
FIG. 1a shows a method for a streaming rendering implemented on a server according to a first embodiment of the invention.

FIG. 1a shows a method for a streaming rendering implemented on a server according to a first embodiment of the invention. In step 110, a potentially visible set (PVS) of polygons (triangles) is determined in real-time using graphics data comprising polygons (triangles) and a current camera view as inputs.

According to the invention, the method determines whether an object may be sampled at a given location on screen, given a set of potential camera views or movements. Extending this approach to all sample locations on screen and further to all locations in between, the visibility of all objects may be determined with respect to all others, under all camera movements.

In step 120, the potentially visible set of polygons is augmented with shading data. In step 130, the resulting graphics data is encoded and sent or transmitted to the client.

Figure 1B:
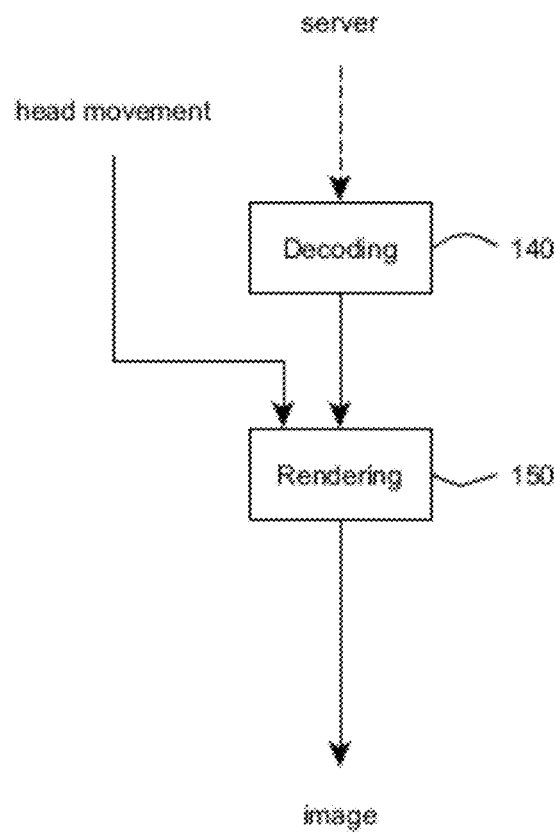
FIG. 1b shows a method for rendering the streamed graphics data received from a server.

FIG. 1b shows a method for rendering the streamed graphics data received from a server. In step 140, the graphics data is decoded. In step 150 the decoded graphics data is rendered using, e.g. information representing a head movement of a user, from which a current view perspective of the user is updated.

In order to show how to take the rendering stream of triangles without connectivity or correspondence to objects as input and to construct the PVS simply from this data stream, a single triangle $T=(p_0; p_1; p_2)$ in clip space, with $p_i=[x_i\ y_i\ z_i\ w_i]^T$ and camera movement within a three dimensional cubic region is considered as a first example. Let the supported camera movements be defined around the current camera location and describe a cuboid defined as $0\pm C$ in camera space, where C corresponds to the camera offset for which the PVS should be computed.

The projection of a triangle is described as the projection of the triangle's edges, which corresponds to planes in the (x,y,w)—subspace of the clip space. The plane for an edge $e_i$ of T is given by the pairwise cross product of the vertices' x, y, and w coordinates:

$$e_{01}=\hat{p}_0\times\hat{p}_1\ e_{12}=\hat{p}_1\times\hat{p}_2\ e_{20}=\hat{p}_2\times\hat{p}_0 \quad (1)$$

where $\hat{p}_i=[x_i\ y_i\ z_i\ w_i]^T$. For a sample location $[x_s\ y_s]^T$ in normalized device coordinates, it may be tested whether the sample location is covered by the triangle, determining its location with respect to all three edge planes. If $$e_i\cdot[x_s y_s 1]^T\leq 0 \forall i,$$

the triangle covers the sample. The dot · indicates the dot product of the vectors.

Considering a potential camera movement $C'=[C_x'\ C_y'\ C_z']$, the camera (view) matrix is altered. For a previous view matrix V the altered view matrix V' is given by $$V' = V + \begin{bmatrix} 0 & 0 & 0 & -C_x' \\ 0 & 0 & 0 & -C_y' \\ 0 & 0 & 0 & -C_z' \\ 0 & 0 & 0 & 1 \end{bmatrix}$$

A point in object space $p_0$ is transferred to its clip space location p using the model (M), view (V) and projection matrix (P):

$$p=P\cdot V\cdot M\cdot p_0$$

For the potential camera movement and a perspective projection with near plane distance n, far plane distance f, and near plane size (2r, 2t), the point's location in clip space is given by $$p = P\cdot V \cdot M \cdot p_0 = P\cdot V\cdot M\cdot p_0 + P\cdot \begin{bmatrix} 0 & 0 & 0 & -C_x' \\ 0 & 0 & 0 & -C_y' \\ 0 & 0 & 0 & -C_z' \\ 0 & 0 & 0 & 1 \end{bmatrix} \cdot M\cdot p_0 =$$

$$p + P\cdot \begin{bmatrix} -C_x' \\ -C_y' \\ -C_z' \\ 1 \end{bmatrix} = p + \begin{bmatrix} n/r & 0 & 0 & 0 \\ 0 & n/t & 0 & 0 \\ 0 & 0 & zz & zw \\ 0 & 0 & -1 & 0 \end{bmatrix} \cdot \begin{bmatrix} -C_x' \\ -C_y' \\ -C_z' \\ 1 \end{bmatrix}$$

Considering the previous discussion, only the x, y and w coordinates of the points are relevant and zz and zw can thus be ignored, which are used to adjust the depth range of the projected points:

$$\hat{p}' = \hat{p} + \begin{bmatrix} -C_x'\frac{n}{r} & -C_y'\frac{n}{t} & -C_z' \end{bmatrix}^T \quad (2)$$

For any camera offset within C, let $$\Delta_x = -C_x'\frac{n}{r}\ \Delta_y = -C_y'\frac{n}{r}\ \Delta_w = -C_z' \quad (3)$$

Without loss of generality, consider the influence of the camera movement on $e_{12}$. The plane equation of edge $e_{12}'$ going through two points $p_1'$ and $p_2'$ evolves as follows $$e_{12}'(\Delta) = \begin{bmatrix} x_1+\Delta_x \\ y_1+\Delta_y \\ w_1+\Delta_w \end{bmatrix} \times \begin{bmatrix} x_2+\Delta_x \\ y_2+\Delta_y \\ w_2+\Delta_w \end{bmatrix} = \quad (4)$$

$$\begin{bmatrix} (y_1+\Delta_y)(w_2+\Delta_w)-(w_1+\Delta_w)(y_2+\Delta_y) \\ (w_1+\Delta_w)(x_2+\Delta_x)-(x_1+\Delta_x)(w_2+\Delta_w) \\ (x_1+\Delta_x)(y_2+\Delta_y)-(y_1+\Delta_y)(x_2+\Delta_x) \end{bmatrix} =$$

$$\begin{bmatrix} \Delta_y(w_2-w_1)+\Delta_w(y_1-y_2)+y_1w_2-y_2w_1 \\ \Delta_x(w_1-w_2)+\Delta_w(x_2-x_1)+w_1x_2-x_1w_2 \\ \Delta_x(y_2-y_1)+\Delta_y(x_1-x_2)+x_1y_2-y_1x_2 \end{bmatrix}$$

The distance $\bar{e}_{12}$ of a given sample $p=[s_x\ s_y\ 1]^T$ (relative to the moving camera) to the edge $e_{12}'$, thus, is given by $$\bar{e}_{12}(\Delta) = e_{12}(\Delta) \cdot s \quad (5)$$

$$= \Delta_x(s_y(w_1 - w_2) + 1 \cdot (y_2 - y_1))$$
$$+ \Delta_y(s_x(w_2 - w_1) + 1 \cdot (x_1 - x_2))$$
$$+ \Delta_w(s_x(y_1 - y_2) + s_y(x_2 - x_1))$$
$$+ s_x(y_1w_2 - y_2w_1) + s_y(w_1x_2 - x_1w_2) + 1 \cdot (x_1y_2 - y_1x_2)$$

For s being a sample location on screen, the offsets $\Delta$ for which the edge $e_{12}$' coincides with the fragment s are defined by $\bar{e}_{12}(\Delta)=0$. In other words, those camera offsets for which the fragment moves outside the triangle edge. It can clearly be observed that for a given triangle T and a given point s, $\bar{e}_{12}=0$ corresponds to a plane in a three dimensional space over $\Delta$. This space is the camera offset space.

$$\bar{e}_{12}(\Delta) = 0 \quad (6)$$
$$= \Delta_x \cdot \bar{e}_{12,x} + \Delta_y \cdot \bar{e}_{12,y} + \Delta_w \cdot \bar{e}_{12,w} + \bar{e}_{12,0}$$
$$= \Delta \cdot [\bar{e}_{12,x} \; \bar{e}_{12,y} \; \bar{e}_{12,w}]^T + \bar{e}_{12,0}$$

with $$\bar{e}_{12,x} = s_y(w_1 - w_2) + 1 \cdot (y_2 - y_1) \quad (7)$$
$$\bar{e}_{12,y} = s_x(w_2 - w_1) + 1 \cdot (x_1 - x_2)$$
$$\bar{e}_{12,w} = s_x(y_1 - y_2) + s_y(x_2 - x_1)$$
$$\bar{e}_{12,0} = s_x(y_1w_2 - y_2w_1) + s_y(w_1x_2 - x_1w_2) + 1 \cdot (x_1y_2 - y_1x_2)$$

If only two-dimensional camera offsets are allowed, $\Delta_w=0$, i.e., visibility from a plane, the offset space becomes 2D and $\bar{e}_{12}(\Delta)=0$ corresponds to a line.

Considering not only one edge, $e_{12}$, but also all three triangle edges, it becomes apparent that the combination of $\bar{e}_{01}(\Delta)=0$, $\bar{e}_{12}(\Delta)=0$, $\bar{e}_{20}(\Delta)=0$ forms a tetrahedron in 3D offset space and a triangle in 2D offset space. Let the volume of the tetrahedron/the covered area of the triangle be noted as $T_\Delta$. $T_\Delta$ describes for which camera offsets the fragment s will be covered by triangle T.

Similarly to transferring a triangle into camera offset space, one may also consider points in COS, i.e., computing under which offsets a vertex' projection exactly coincides with the sample location. To compute the normalized device coordinate (NDC) representation of a point in clip space, one simply needs to perform the perspective division:

$$p_{ndc} = [x_p/w_p, y_p/w_p^T]$$

The combination with equation 2 and $\Delta$ yields:

$$\frac{x_p + \Delta_x}{w_p + \Delta_w} = s_x \quad \frac{y_p + \Delta_y}{w_p + \Delta_w} = s_y \quad (8)$$

$$\Delta_x - \Delta_w s_x = w_p s_x - x_p \quad \Delta_y - \Delta_w s_y = w_p s_y - y_p$$

For the 3D offset space considering visibility from a cuboid region, the two equations describe a line. For visibility from a planar region, i.e., $\Delta_w=0$, the equations describe a single point.

While the camera offset space provides information about under which offsets a fragment is covered by a triangle or exactly meets the projection of a vertex, it does not consider the maximum support camera movement. The camera movement is simply a cuboid in 3D offset space and a rectangle in 2D offset space, each defined by the maximum offset±C. Thus, visibility considerations under the given camera offset, should be limited to ±C.

Analyzing the derived equations, one may draw the following conclusions about the COS: First, triangles that are further from the camera cover a larger volume/area in COS. This is not surprising, as objects far away from the camera move little when the camera is moved. This is exactly inverse to the area a triangle covers when being projected on the screen. Second, a larger triangle at the same distance covers a larger area/volume than a smaller one. This is also intuitive, as larger triangles will cover a sample location under more camera movement than smaller ones. Third, stepping along $\Delta_w$, the cross section with a x/y plane increases in size in the COS. This effect describes, that as the camera gets closer to a triangle, the triangle's projection becomes larger and covers a sample location under larger offsets in x/y.

FIG. 2 shows examples for some triangle constellations and camera offset space constellations. The most important fact about the COS is that the triangle's volume/area corresponds to the maximum camera offset it covers a given fragment, irrespective of the projected size of a triangle. At the same time, the maximum supported camera offset corresponds to a simple rectangle/cuboid. The combination of these facts allows for efficient visibility computations in the COS.

More particularly, FIG. 2a shows an example of projecting two triangles $t_1$ and $t_2$ with equal view space size. In FIG. 2b, it is shown that the closer one will be larger after projection. In FIG. 2c, it is shown that when computing the 2D COS for the marked sample point, the relations are inverted, as distant triangles cover a sample for a larger offset. The rectangle shows the maximum supported camera offset, for which triangle $t_1$ covers the triangle $t_2$ entirely.

The camera offset space also lends itself to computing visibility between triangles for a single sample location. To evaluate the potential visibility of two triangles T and Q at fragment s under possible camera offsets $\Delta$, $T_\Delta$ and $Q_\Delta$ are determined, i.e. embedded into camera offset space. Intersecting $T_\Delta$ with $Q_\Delta$ within ±C, whose volume/area in offset space shall be denoted as $C_\Delta$, three cases can be distinguished:

$$T_\Delta \cap Q_\Delta \cap C_\Delta = T_\Delta \cap C_{66} \quad (1)$$

$$T_\Delta \cap Q_\Delta \cap C_\Delta = Q_\Delta \cap C_{66} \quad (2)$$

neither of the above. (3)

In case of (1), the part of $T_\Delta$ inside ±C, overlaps with $Q_\Delta$, i.e., for every camera offset that samples T, Q will also be sampled. Thus, if Q is closer to the camera for all those samples, T will never be visible at sample s. In case of (2), the relation of the triangles is reversed and Q will never be visible if T is closer. In case (3) both triangles may generate visible samples at s under different camera offsets.

Clearly, this already points to the fact that when considering visibility in the COS, there is no need to explicitly distinguish between occluder and occludee up front, as the relationships of the covered space in the COS allows to either be considered as occluder or occludee.

To determine whether a triangle is in front of another in the COS corresponds to determining the exact depth value a triangle will produce for a fixed sample on the image plane under all camera offsets. To compute this depth value, consider the formulas described in homogeneous rasterization [Marc Olano and Trey Greer. 1997. Triangle scan conversion using 2D homogeneous coordinates. In Proceedings of the ACM SIGGRAPH/EUROGRAPHICS workshop on Graphics hardware. ACM, 89-95.]: The interpolated 1/w component, which interpretable as the inverse of the depth, for a triangle at sample location s is:

$$\frac{1}{w_s} = \begin{bmatrix} 1 & 1 & 1 \end{bmatrix} \cdot \begin{bmatrix} x_0 & x_1 & x_2 \\ y_0 & y_1 & y_2 \\ w_0 & w_1 & w_2 \end{bmatrix}^{-1} \cdot \begin{bmatrix} s_x \\ s_y \\ 1 \end{bmatrix}.$$

Considering camera offsets, the formula extends to $$\frac{1}{w_s} = \begin{bmatrix} 1 & 1 & 1 \end{bmatrix} \cdot \begin{bmatrix} x_0 + \Delta_x & x_1 + \Delta_x & x_2 + \Delta_x \\ y_0 + \Delta_y & y_1 + \Delta_y & y_2 + \Delta_y \\ w_0 + \Delta_w & w_1 + \Delta_w & w_2 + \Delta_w \end{bmatrix}^{-1} \cdot \begin{bmatrix} s_x \\ s_y \\ 1 \end{bmatrix}.$$

Solving this equation for $w_s$ using the adjugate matrix and determinant to compute the inverse, many terms cancel out to yield $$w_s = \frac{\Delta_x d_x + \Delta_y d_y + \Delta_w d_w + d_0}{d_{adj}} = \frac{\Delta \cdot d + d_0}{d_{adj}} \quad (9)$$

$d_x$, $d_y$, $d_w$, and $d_{adj}$ are all functions of ($p_0$, $p_1$, $p_2$, s) and thus constant for a given triangle and a certain sample location. The structure shows that extending the 3D COS to 4D by adding the depth information and extending the 2D COS to 3D, the triangle/tetrahedron is embedded on a flat hyperplane in the respective space. This result allows two conclusions. First, for every point in the COS the corresponding depth value can efficiently be computed using equation 9, in both 2D and 3D COS ($\Delta_w=0$). Second, the 2D COS can be seen as an orthographic projection of triangles from a 3D space where the third dimension corresponds to depth. Determining the visibility in this orthographic projection within ±C yields the visibility of the involved triangles under the given sample location. Although more complicated to imagine, the same considerations hold for 3D COS, where depth forms a fourth dimension in which an orthographic projection down to 3D yields the visibility.

Applying the considerations derived for a single sample for all pixels of a rendered image, the PVS considering the occlusion between triangle pairs for movements around the current camera location could be computed. A simple union of all triangles potentially visible under any sample location would yield the overall PVS.

To consider also rotational movements, the first step is an increased field of view (fov). Thus, sample locations to the left/right and top/bottom of the current view are also considered. However, when rendering with a rotated camera, sample locations will not coincide with the samples chosen with the wider fov. While a triangle may never become visible at two adjacent sample locations in the reference view, rotation will pick sample in between them and might reveal the triangle in question. One could consider a higher sampling density when computing the PVS and thus get a good approximation of the PVS.

Intersections of many tetrahedrons is probably too time consuming especially when considering additional samples due to rotation. Similarly to previous work [Durand et al. 2000. Conservative visibility preprocessing using extended projections. In Proceedings of the 27th annual conference on Computer graphics and interactive techniques. ACM Press/Addison-Wesley Publishing Co., 239-248], the PVS for a 3D region can also be computed from multiple 2D regions, especially when considering camera rotations: For a cuboid cell, the visibility can be constructed for all six bounding planes, placing the camera in the center of each side plane and matching its dimension with Δ.

FIG. 3 shows how the potentially visible set for a 3D region (view from above), can be computed by 2D regions for all sides, with reduced rotation angles. In particular, the evaluated camera positions correspond to all side plane positions.

By additionally considering a nearly 180° fov, not only all camera positions on the cuboid cell are considered but also all viewing directions from that cell. The union PVS of the entire side plane PVSs thus matches the PVS for the cuboid cell with a 360° fov (which would also require multiple passes). Using the side plane-based approach allows adjusting the fov to movements, which are more likely in the HMD scenario, like, e.g. forward, and sideward translation and 90° roll. The envisioned algorithm would thus render the entire scene in multiple passes (fitting the desired view cell) and deliver the PVS.

For a practical implementation of the PVS using COS during rasterization, the COS for each pixel must be constructed and resolved. To construct the COS at each pixel location, all triangles $T_i$ that fulfill $T_\Delta \cap C_\Delta \neq \emptyset$ need to be considered, i.e., all triangles that under any supported camera offset may cover the pixel. To gather all those triangles for each pixel, a list can be constructed during rendering, similar to the approaches used for order-independent transparency [Yang et al. 2010]. To be able to add all triangles that may cover a pixel to the list, they need to be expanded in size before rasterization. This expansion obviously depends on the maximum camera offset C and may be larger than the size of one pixel. However, an approach similar to workarounds employed before GPUs offered hardware-supported conservative rasterization can be used [Hasselgren et al., Conservative rasterization. GPU Gems 2 (2005), 677-690.].

Storing information about each triangle that might cover a fragment for each pixel in a list, allows to construct the COS for each pixel in a following step. As the visibility considerations unfold around depth relations, it may be beneficial to sort those lists (again similarly to order-independent transparency). The fragment list entries represent an entire triangle and thus need to store all vertex positions such that the triangle can be transformed to COS and its depth equation can be computed. This also means that no single depth value can be associated with entries in the fragment list and the COS depth ranges of entries might overlap. Thus, sorting can only be done approximatively, such that the list is processed in a quasi-front-to-back fashion. The described implementation sorts according to the minimum vertex depth, which places potential occluders early in each list.

The previously described steps ensure that all triangles and only those triangles that influence the visibility at a given pixel location end up in the respective list. As mentioned before, resolving visibility between triangle pairs is hardly sufficient, as only the combination of many triangles in front may form an occluder for more distant triangles.

Thus, occluder fusion is employed during visibility resolution in the COS. The idea of occluder fusion is commonly used for entire objects during PVS construction. The invention proposes an efficient version for triangles that is applicable to the COS, i.e., merge triangles into a larger connected polygon in the COS. The benefits of occluder fusion are twofold. First, it can be more efficient to consider the overlap of a polygon and a triangle than many triangles with one triangle. Second, a fused occluder may occlude a triangle as a whole, whereas its individual parts may not be sufficient. To get the same occlusion information without occluder fusion, the occludee's representation in the COS would have to be individually clipped against all occluder triangles instead to achieve the same result.

With occluder fusion the process mathematically corresponds to $$T_{\Delta fused} = T_{\Delta 0} \cup T_{\Delta 1} \cup T_{\Delta 2}$$

$$O = Q_{66} \cap T_{\Delta fused} \cap C_{66}.$$

where $T_{\Delta i}$ form the fused occluder and O yields information about the potential visibility. Without occluder fusion, the process corresponds to $$Q_{66}' = Q_{66} \setminus T_{\Delta 0} \setminus T_{\Delta 1} \setminus T_{\Delta 2}$$

$$0 = Q_\Delta' \cap C_\Delta.$$

The first version is faster, if $T_{\Delta\ fused}$ can be reused, is efficient to compute and allows for efficient testing against $Q_\Delta$. The major issue with the second approach is that the shape of all intermediate $Q_\Delta \setminus T_{\Delta i}$ may become arbitrarily complex, whereas the fused occlude can be constructed in such a way that its shape allows for efficient testing.

Limiting the approach to 2D COS (as outlined before), the first strategy may be chosen and triangles may be fused to larger occluders if they share an edge in the COS. Two triangles share and edge in the COS, if they also share an edge in world space. Following this strategy, closed surfaces are the only objects that form larger occluders.

FIG. 4 shows example steps of the proposed progressive visibility resolution algorithm. Active edges are drawn thicker and reference points are indicated. The active occluder silhouette always corresponds to the active edges and intersections of active edges outside are ignored.

More particularly, a first triangle $Q_\Delta$ is transferred to COS (a) and kept as potential occluder $O_{\Delta,0}$ (b). Outside triangles $Q_\Delta$ are immediately discarded (c). Another triangle $Q_\Delta$ is processed (d) and forms a second occluder $O_{\Delta,1}$ (e). The next triangle $Q_{\Delta,0}$ is invisible (case b) (f). A triangle $Q_{\Delta,1}$ sharing two edges (g) fuses the occluders $O_{\Delta,0}$ and $O_{\Delta,1}$ into a large occluder $O_{\Delta,0}$ (h). Triangles $Q_\Delta$ intersecting the silhouette are kept (i).

FIG. 5 shows, in pseudocode, a method for progressive visibility resolution according to an embodiment of the invention, with example steps for some triangles in FIG. 4. The method runs through the list of approximately sorted triangles (Lines 2-47) and determines the visibility for one triangle after the other. Previously checked triangles are kept as potential occluders and are merged to larger occluders if they share edges.

For every triangle, its COS representation is determined (Line 3). The method then computes its overlap with $C_\Delta$, discarding triangles that might have ended up in the list but actually are not visible under the supported camera offset. This gives the list construction method the ability to work conservatively, which is necessary due to floating point inaccuracies. To determine whether there is an overlap between $Q_\Delta$ and $C_\Delta$, the method intersects the triangle's edges with $C_\Delta$ (Line 5). While there would be more efficient ways to perform this check, one obtains additional information about the triangle edges, which is utilized for more efficient tests in the later stages of the algorithm. Edges are classified as either inside, inactive, or crossing. An inside edge is completely contained in $C_\Delta$, a crossing edge reaches from $C_\Delta$ outside. Edges that are completely outside of $C_\Delta$ are marked as inactive and ignored during the algorithm. If all edges are inactive (Line 10), the triangle is either completely outside $C_\Delta$ and will not be visible at this sampling location, or completely covers $C_\Delta$. To check the latter, one may simply insert o into the triangle's edge equations to determine whether it covers the Origin of the COS, similarly to the way rasterization on the GPU utilizes triangle edge equations.

If a triangle is not discarded during the first step, meta information about the triangle is set up (Lines 11-12). This includes one to three points of the triangle that is both inside $Q_\Delta$, and $C_\Delta$, which are called triangle's reference points. If the triangle covers $C_\Delta$ entirely, Origin is chosen. Otherwise, for each edge labeled as inside or crossing we choose one representative point. This is either one of the edge's endpoints ($q_0$, $q_1$, or $q_2$) depending on which points lie inside of $C_\Delta$. If both endpoints are outside $C_\Delta$ (i.e. we are choosing a reference point of a crossing edge), one computes the exact intersection with $C_\Delta$. Furthermore, the coefficients needed to evaluate the depth function in the COS are computed and stored for later use.

With this information at hand, the actual visibility test can be run (Lines 14-35). For every triangle, it is assumed that it is visible at first. It is only discarded if it is determined that it is hidden by any occluder, over which the method iterates (Line 15). For each occluder, information is stored whether it covers $C_\Delta$, and in case it does so, a large portion of the method is skipped (Lines 15-30), because it is certain there is a full overlap between the occluder and the triangle within $C_\Delta$ and case (2) from above holds.

If the occluder does not cover $C_\Delta$, it needs to be determined whether $Occluder_\Delta \cap Q_\Delta \cap C_\Delta = Q_\Delta \cap C_\Delta$, i.e., whether $Q_\Delta$ is completely inside the fused occluder within $C_\Delta$. To this end, it is at first determined if there is an overlap between the triangle and the silhouette of the occluder within $C_\Delta$. This step is made significantly more efficient when relying on the edge status. Instead of keeping the silhouette around explicitly, the method iterates over all occluder triangles $T_\Delta$ (Line 18) and tests all occluder triangle edges against all edges of $Q_\Delta$. If either edge is inactive, the test is simply skipped. This does not only include edges outside of $C_\Delta$, but also edges inside the occluder, which are set inactive when fusing triangles (Line 28). By not explicitly storing the silhouette of occluders, the method might do additional work in this step. However, with a GPU implementation in mind, this choice is sensible as it significantly reduces dynamic data management, storage overhead, and indirections.

To compute the relation between two edges, it is first tested whether they are the same (Line 23) and if they are, the method stores information for later fusion of the triangle with the occluder being tested. Otherwise, it is checked if there is an intersection between the edges (Lines 25-26) and whether it is inside $C_\Delta$. The method actually does not need to compute the exact intersection point i if either of the edges is marked as inside, as it is then known that the intersection must be inside. Only if both are crossing, the method continues to verify whether the intersection is inside or outside. In case the intersection is outside, it is ignored, as this does not influence $Occluder_\Delta \cap Q_\Delta \cap C_\Delta$. If it is inside, it is known that $Q_\Delta$ reaches outside of $T_\Delta$ and outside $Occluder_\Delta$ within $C_\Delta$. Thus, the triangle is not occluded by $Occluder_\Delta$ under all camera offsets and the method continues with the next occluder (Line 27).

At this point of the algorithm, if there is no overlap found between the silhouette of the occluder and the triangle being tested, there are six possible cases to consider.

Figure 6:
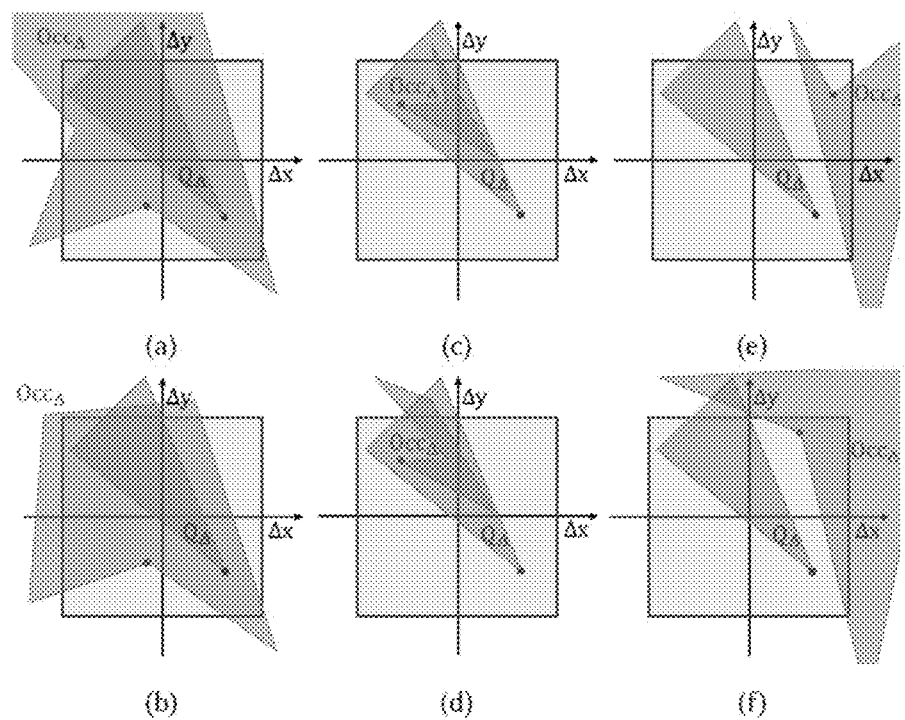
FIG. 6 shows six possible cases that do not have silhouette intersections.

More particularly, FIG. 6 shows six possible cases that do not have silhouette intersections within $C_A$. (a,b), (c,d), and (e,f) can be distinguished based on their respective reference point locations:

(a) $Q_A$ is completely inside Occlude$_A$
(b) $Q_A$ is inside Occluder$_A$ only within $C_A$.
(c) Occluder$_A$ is completely inside $Q_A$
(d) Occluder$_A$ is inside $Q_A$ only within $C_A$.
(e) Occluder$_A$ and $Q_A$ are completely disjoint
(f) Occluder$_A$ and $Q_A$ are disjoint only within $C_A$.

To distinguish between the cases, the method uses $Q_A$'s reference points as well as a reference points that are kept for each occluder (Occluder.ref in the algorithm), which must be a point on the occluders silhouette inside $C_A$. If Occluder.ref is inside $Q_A$, which can again be trivially tested using the edge equations, it is either case (c) or (d). Then, the occluder does not cover $Q_A$ and the method can continue with the next occluder (Line 17). The occluder's reference point is updated after a triangle is fused with an occluder or inserted as new occluder (Line 47). Also, the occluder's reference point must be a point on the silhouette of the occluder, otherwise the method could not distinguish cases (a,b) and (c,d). The rationale behind this test is that if there is no intersection between the occluder's silhouette and $Q_A$ (inside of $C_A$) and a point on the silhouette (inside $C_A$) is inside $Q_A$, the entire occluder silhouette (inside $C_A$) must be contained in $Q_A$.

To distinguish between (a), (b), which both result in Q being invisible and (e), (f), which both yield Q as not occluded, the method tests whether the triangles reference points are inside the Occluder$_A \cap C_A$. The rationale is again the same as in the previous case, just vice versa. However, as it has already been ruled out that the occluder is contained in $Q_A$, the method can choose any point $\in Q_A$ as reference point. As the reference point is chosen to lie inside $C_A$, the method only needs to determine whether it is inside Occluder$_A$. However, the occluder may have a concave shape, thus the test is more involved than in the first case and it is computed as the final check (Line 32). To this end, the method again iterates over all occluder triangles and trivially checks whether the point is inside any of them. In case it is, it has been verified that $Q_A \cap C_A$ is inside Occluder$_A$. However, for Q to be occluded, Q must be behind the occluder, which is verified at the reference point using the occluder triangle's depth equation (Line 34). This is only sufficient if triangles are not penetrating. To support that situation, one would have to compute the exact 3D constellation in COS between $Q_A$ and all occluder triangles.

If all tests yield that Q is visible, $Q_A$ is added to the occluders and their states are updated (Line 47-37). If the triangle shares one or multiple edges with other occluders, it is attached to those occluders, creating a larger fused occluder. This step may also merge up to three occluders. Furthermore, the method sets the shared edges to inactive, such that they are not tested for edge overlaps. Additionally, it is checked whether any of the occluder edges are still active or crossing. If none is, the occluder covers $C_A$ and the method sets the coverall flag to speed up testing against the occluder.

After all triangles have been processed, all potentially visible triangles have been inserted as occluders and they can directly be output as the PVS for sample s. As the method is sorting the list according to minimal depth, it should first process potential occluders. However, as there might be a depth overlap between triangles, a triangle arriving later can cover a triangle already marked as occluder inside $C_A$. To test for this situation, the method could test each triangle again against the complete list of occluders. However, in experiments done by the inventors, the number of additionally discarded triangles turned out to be negligible.

All of the considerations so far only considered individual sample locations. However, for rotations, it is necessary to consider the COS for locations in between. Also, if locations between samples are handled, the visibility pass can be run in reduced resolution. With this goal, the COS is extended with another two dimensions, namely the sample offset $\delta_x$ and $\delta_y$, in x and y, respectively. They form linear offsets to the sample location s while a maximum offset of ±pixelsize/2 makes sure the method shown in FIG. 5 considers all possible samples on the viewport. For a point, equation (8) for a 2D COS extends to:

$$\frac{x_p + \Delta_x}{w_p} = s_x + \delta_x, \quad \frac{y_o + \Delta_y}{w_p} = s_y \delta_y \quad (10)$$

$$\Delta_x - w_p \delta_x = w_p s_x - x_p \quad \Delta_y - w_p \delta_y = w_p s_y - y_p,$$

which corresponds to a line in 4D space. This also means that triangle edges slide and rotate when moving along the $\delta_x$ and $\delta_y$ dimension.

While this extension makes the COS significantly more complicated, the changes to the method shown in FIG. 5 are manageable. The major changes are concerned with edge intersections. Instead of determining if a triangle edge intersects with $C_A$ (Line 5), the modified method needs to determine if it intersects $C_A$ under any $\delta$. The same is true for edge-edge intersections (Line 27).

All other computations can remain the same under the following assumptions: First, the depth relations of a triangle and an occluder remain the same under any $\delta$. Already ruling out penetrating triangles that assumption holds. Second, the inside-outside tests between occluder and triangle for $\delta=0$ carry over to all sample offsets. This assumption holds, if the silhouette-triangle intersection algorithm reports if there is an intersection under any sample offset. If there is none, then the occluder reference point check (Line 17) and the triangle reference point check (Line 32) can be run with $\delta=0$ to draw conclusions for all $\delta$.

The issue of edge-$C_A$ intersection and edge-edge intersection under a sample offset are essentially the same problem, where the first does not apply any offset to the boundary edges of $C_A$. As one is only interested in whether there is an intersection and not in the exact location of the intersection (unless both edges are flagged as crossing), a simple test for line segment intersection detection can be used. Computing the orientations of all groups of points triples form such an efficient test (ignoring sample offset):

$$0 = (y_1 - y_0) \cdot (x_2 - x_1) - (x_1 - x_0) \cdot (y_2 - y_1),$$

with $[x_i\ y_i]^T$ being the coordinates of point i.

These computations can easily be extended to the sample offset dimension, by inserting equation 10 for all points. Solving the resulting equation for $\delta$ yields a line, that describes when the orientation of the three points changes while stepping through the sample offset dimension. Computing this line for all four groups of orientations, yields regions with different orientation. Most often, the region changes happen ±pixelsize/2 and thus do not need to be considered. If they happen inside, the method may simply compute the intersection of the lines, i.e., the points where two orientations change. By evaluating the detection of line segment intersections under these points while ignoring those orientations that flip, allows for an efficient test whether there is a line-segment intersection under any sample offset.

The only remaining issue is to determine whether a detected intersection of two edges marked as crossing is outside $C_A$ under all sample offsets. Unfortunately, the function describing the exact intersection is non-linear in $\delta$ and does not allow for an efficient computation. However, expressing the intersection by inserting the parameter-free line equation of one edge into the parameterized equation of the other yields a hyperbola in $\delta$. Computing the first derivative of this function and setting it to zero yields the maximum parameter range for the parameterized edge under which an intersection can occur. By additionally considering the intersect parameter at ±pixelsize/2 and the bounds introduced by the edge itself (0,1), one ends up with a parameter range under which an intersection can occur. Additionally, due to the edge being a linear construct, the maximum displacement of each edge point is given by the maximum displacement of its endpoints, which are itself given by equation 10. Evaluating the line equation for the extrema of the parameter range and extending the resulting $\Delta$ range with the maximum endpoint displacement under $\delta$ gives a conservative estimate of where the intersection of the edges in the COS can occur. If this conservative estimate does not intersect $C_A$, the edge intersection is certainly outside $C_A$. Using a conservative estimate here result in a potential increase of the PVS, but never removes necessary triangles.

Figure 7:
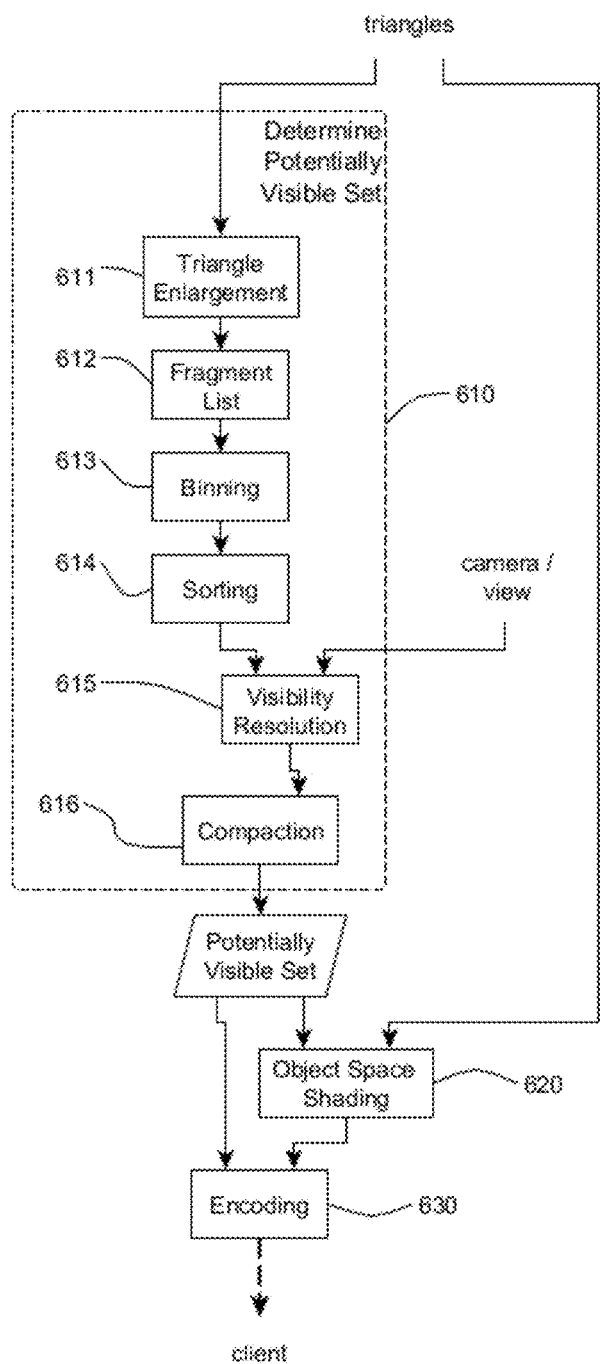
FIG. 7 shows a method for streaming rendering according to a further embodiment of the invention, implemented on a server.
Figure 8A:
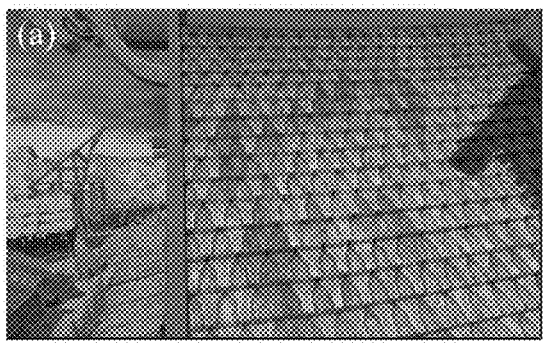
FIGS. 8(a)-8(f) show example views of a large outdoor scene (4.6M triangles) recorded during different use case scenarios.
Figure 8D:
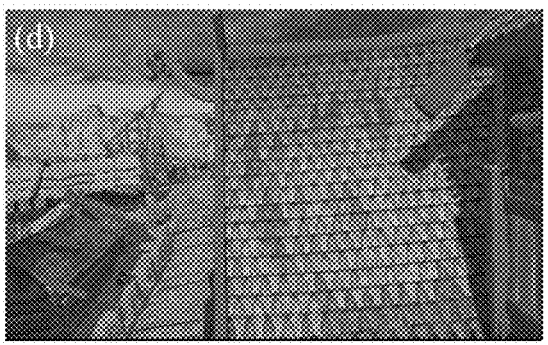
Figure 8B:
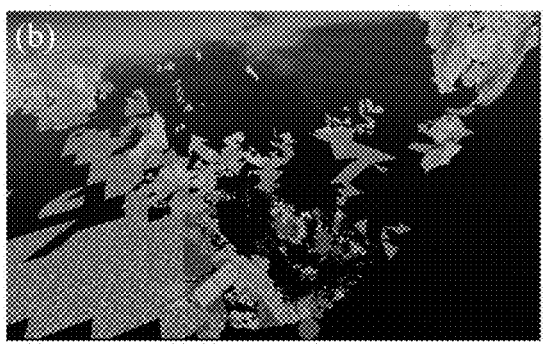
Figure 8E:
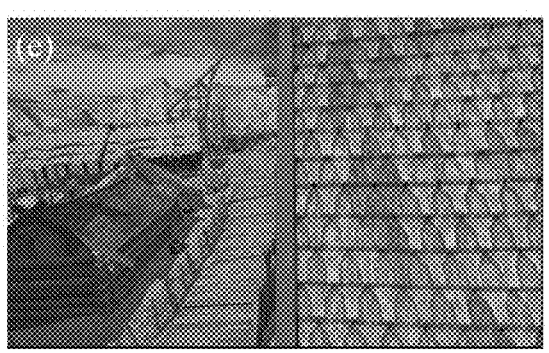
Figure 8C:
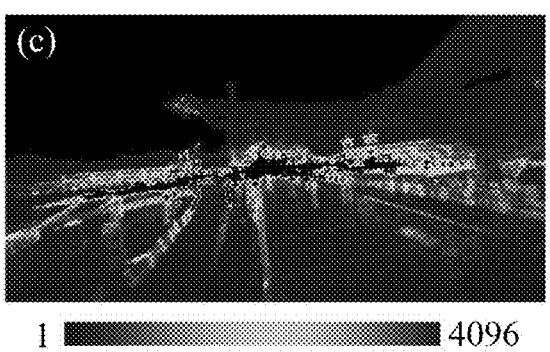
Figure 8F:

FIG. 7 shows a method for streaming rendering according to a further embodiment of the invention, implemented on a server.

In step 610, a potentially visible set of polygons is constructed, based on graphics data comprising polygons (triangles) and a current camera view, using multitude of potential camera/view offsets. The COS PVS algorithm is implemented on the GPU, using a combination of OpenGL and CUDA. The same functionality and similar performance can also be achieved using any other graphics API and compute mode shader execution.

Starting from simple geometry input, the PVS is computed, which yields a list of triangles.

The creation of the PVS involves the combination of multiple 2D COS evaluations for up to six rasterized views. For a cuboid view cell supporting 360° of rotation, six views need to be rasterized. Limiting the rotation to 180° around the y-axis, three views are sufficient.

In step 611, for each of these views, every input triangle is enlarged to cover all fragments that might be hit by it under any supported camera offset. To this end, a similar approach to conservative rasterization is employed in the geometry shader [Durand et al. 2000]. The triangle enlargement around each vertex must consider both the distance between samples and the maximum camera offset scaled with $1/w_p$ as shown in equation 10. This fact complicates the approach slightly, as the usual approach of computing the triangle's edge equations and moving them apart is not possible, because the edge will be subject to rotation if the vertices have different w components. Thus, one computes all four maximum vertex offset locations and chooses the ones that are furthest from the original edge to construct a conservative estimate of the triangle coverage. The discussed approach may fail, if vertices are behind the camera, i.e., if their w coordinate is negative. In these cases, the edges are clipped to the near plane before moving them accordingly. It is still sufficient to create a single triangle only, when using the clipping rectangle approach to construct the output geometry.

In step 612, the fragment list construction is done in the fragment shader, where the original triangle coordinates are inserted into the fragment list. They are simply passed from the geometry shader. For the fragment list construction, a singly linked list with a head pointer and counter for each list is used. The cost for constructing these lists is slightly higher than when only considering transparency, as the geometry has been enlarged. To reduce the number of elements stored in the list, an early z discard value can be stored with each list: In case a triangle is detected that covers the entire COS, the early z can be updated using an atomic min instruction using the triangles maximum depth. Comparing other triangles minimum depth value to the stored early z value, before they are added to the list, allows us the discard them as they can never be seen under the given sample.

The next steps involve binning and sorting. As the PVS for all fragments of all rendered views are to be merged, all lists can be stored in a single buffer and resolved in a single step. Working on different list sizes involves vastly different number of steps. For short lists, one would want to use a single thread, medium sized lists can be handled in small thread groups, e.g., within a warp, and long lists should be worked on by many threads.

To this end, the lists are first binned in step 613 according to their length, which is stored alongside the head pointer of the list. This is done with a simple CUDA kernel using atomic operations. Currently, bins are used for all powers of two up to a length of 256 and the bin size is then increased by 128 until 15 616 is reached and all lengths above this length are treated equally.

In step 614, all lists are sorted according to the minimum vertex depth of all triangles. Very short lists (<8 elements) are sorted with one thread per list. For list sizes <64 bitonic sort in sub-warp sized groups according to the list length is used. For lists with <4096 elements, radix sort within blocks is used [Merrill. 2015. CUB v1.5.3: CUDA Unbound, a library of warp-wide, block-wide, and device-wide GPU parallel primitives. (2015)] and for larger lists, device-wide radix sort is used. The sorting kernels not only sort the lists, but also extract them from the linked list representation into a flattened array representation for faster access during the resolution step. The different sorting kernels can be executed in different streams and can be run in parallel on the GPU.

In step 615, the visibility of the individual triangles is resolved, under a given multitude of different possible camera views. The resolution step also distinguishes between different list sizes. Very small lists are again run with a single thread, directly implementing the method shown in FIG. 5. Small lists are executed with sub-warp groups. To parallelize the algorithm, occluder fusion is first performed in parallel for all $Q_A$ and then each triangle is tested against the fused triangles. The triangle fusion approach can rely on efficient warp-wide communication primitives such as register shuffle instructions and warp voting. Triangle data is stored in shared memory. For larger lists, the same steps are performed, but relying on shared memory for communication. As lists grow even larger, not all triangles are fusible before resolution, due to shared memory restrictions. In these cases, the methods works on a batch basis, where each thread loads one triangle, performs occluder fusions with all other concurrently incoming triangles and the ones stored from previous iterations, computes its visibility and only adds the triangle to the stored occluders if it is visible. This process continues until the entire list is processed. In case the method run out of shared memory to store the intermediate result, the occluder set is unchanged and triangles are marked as visible but not added to the occluders in shared memory. Due to the sorting of the list, the most important occluders should anyway be constructed first.

If a triangle is visible, a flag is set in global memory to indicate that it needs to be shaded and transmitted to the client.

To make sure that the primitive order is not changed when constructing this list of triangles, the array of flagged triangles is compacted in step 616 using a prefix sum.

For object space shading in step 620, the approximated number of required samples for each triangle and the shadings are computed and stored in a texture that is compressed in step 630 and transmitted to the client.

On the client side, simple textured rendering of the transmitted triangles is performed according to the current view.

If client's view reaches outside of the supported boundary it may be the case that the client won't be able to construct an entirely correct view from the geometry it received from the server. Incorrect disocclusions may appear or the geometry may be entirely missing.

Prediction of the required view can mitigate this scenario. A deep neural network can be trained to predict the user movement given the scene characteristics. This will yield the required camera boundary in terms of translation and rotation for different parts of the scene depending on the use-case.

Another approach to mitigate the perceived incorrectness of the off-boundary view rendering, when this case is detected by the client, could be inpainting the incorrect scene regions (Patel et al, Review of Different Inpainting Algorithms; International Journal of Computer Applications, 2012, vol. 59, no. 18, p. 30-34) or utilizing one of the Image-Based-Rendering (IBR) approaches. These approaches, however, introduce their own set of artifacts, so the method cannot guarantee constructing entirely correct view outside the supported boundary. Methods such as Asynchronous Space Warp, Forward-warping techniques [George Wolberg. 1998. Image morphing: a survey. .eVisual Computer 14, 8-9 (1998), 360-372. h.ps://doi.org/10.1007/s003710050148] such as point-splatting [Shenchang Eric Chen and Lance Williams. 1993. View Interpolation for Image Synthesis. In Proceedings of the loth Annual Conference on Computer Graphics and Interactive Techniques (SIGGRAPH '93). ACM, New York, N.Y., USA, 279-288. h.ps://doi.org/10.1145/166117.166153] improved by meshes [Piotr Didyk, Tobias Ritschel, Elmar Eisemann, Karol Myszkowski, and Hans-Peter Seidel. 2010b. Adaptive Image-space Stereo View Synthesis. In Vision, Modeling and Visualization Workshop. Siegen, Germany, 299-306; Kyungmin Lee, David Chu, Eduardo Cuervo, Johannes Kopf, Alec Wolman, Yury Degtyarev, Sergey Grizan, and Jason Flinn. 2015. Outatime: Using Speculation to Enable Low-Latency Continuous Interaction for Mobile Cloud Gaming. GetMobile: Mobile Comp. and Comm. 19, 3 (December 2015), 14-17. h.ps://doi.org/10.1145/2867070.2867076; Marc Olano and Trey Greer. 1997. Triangle scan conversion using 2D homogeneous coordinates. In Proceedings of the ACM SIGGRAPH/EUROGRAPHICS workshop on Graphics hardware. ACM, 89-95.] or ray-tracing [Sven Widmer, D Pajak, Andr'e Schulz, Kari Pulli, Jan Kautz, Michael Goesele, and David Luebke. 2015. An Adaptive Acceleration Structure for Screen-space Ray Tracing. In Proceedings of the 7th Conference on High-Performance Graphics (HPG '15). ACM, New York, N.Y., USA, 67-76. h.ps://doi.org/10.1145/2790060.2790069] or Backwards-warping methods [Huw Bowles, Kenny Mitchell, Robert W. Sumner, Jeremy Moore, and Markus Gross. 2012. Iterative Image Warping. Computer graphics forum 31, 2 (May 2012), 237-246. Diego Nehab, Pedro V. Sander, Jason Lawrence, Natalya Tatarchuk, and John R. Isidoro. 2007. Accelerating Real-time Shading with Reverse Reprojection Caching. In Proceedings of the 22Nd ACM SIGGRAPH/EUROGRAPHICS Symposium on Graphics Hardware (GH '07). Eurographics Association, Aire-la-Ville, Switzerland, Switzerland, 25-35. h.p://dl.acm.org/citation.cfm?id=1280094.1280098; Lei Yang, Yu-Chiu Tse, Pedro V. Sander, Jason Lawrence, Diego Nehab, Hugues Hoppe, and Clara L. Wilkins. 2011. Image-based Bidirectional Scene Reprojection. ACM Trans. Graph. 30, 6, Article 150 (December 2011), 10 pages. h.ps://doi.org/10.1145/2070781.2024184] can be used to this end.

There are multiple ways to calculate the correct shading data for the PVS geometry on the client. The most straightforward way is that the client stores all the data required for calculating ground truth shading and simply calculates it for the reduced geometry set received from the server. As this may take up significant resources on the client or even span out of the client's possibilities, the server could pre-calculate the shading data and send it to the client along with the PVS geometry data. The shading can be split into view-dependent and view-independent parts. Both parts can be calculated on the server, or the view-dependent part can be additionally calculated on the client given the exact view and then correctly merged with the view-independent part received from the server.

The shading data can be gathered per-triangle, per-view, per-pixel or per an arbitrary sample. This shading information can be stored in color buffers or textures to allow fast interpolation. It will then be encoded on the server, sent to the client along with the PVS geometry data and then decoded and used for rendering by the client.

The predicted movement may also be included directly into COS and transmitted to the client.

To evaluate the inventive approach, it was tested for 3D scenes with various characteristics. The proposed PVS algorithm was run on an Intel Xeon CPU E5-2637 @3.5 GHz with 16 GB of RAM and an NVIDIA Titan X (pascal). For all tests, a head movement of 5 to 10 cm and a rotation of ±30 degree were considered. The camera fov is 60 degree.

FIGS. 8(*a*)-8(*f*) show example views of a large outdoor scene (4.6M triangles) recorded during different use case scenarios. The scene poses a variety of challenges for the inventive methods, including long fragment lists, small slanted triangles, and multiple layers of slightly offset structures.

Starting from a reference view (a), the potentially visible set (PVS) is determined for a region around the camera (b). To construct the PVS, all triangles are collected that can cover a fragment in per-fragment list of varying size and resolve the visibility in the proposed camera offset space (c). Novel views rendered with the PVS for viewpoints around the reference location are complete and hole free (d)-(f).

The method clearly yields the currently visible triangles and objects that may become visible under head movement. In particular, the roof occludes large parts of the scene and no geometry behind the roof is classified as visible. As the viewpoint is to the right of the roof, a slight movement to the right or rotation will open up the view to the mountain in the back. The respective triangles are clearly classified as potentially visible. This indicates that both occluder fusion and potential visibility work correctly.

The table in FIG. 9 shows the size of the PVS, the computation times for the individual steps and bin distributions for the test scene:

The PVS algorithm reduces the number of triangles from 4.6M down to 480 to 590 k for the test scene on average for the tested walk-throughs. In a mobile HMD scenario, such a reduction would result in an immense bandwidth reduction and render-time savings on the client.

As can be seen, computing the PVS for small resolutions already involves multiple millions of entries that need to be resolved. Although our implementation is only a prototype with massive optimization potential, it can determine the visibility of up to 25 million list entries per second. For the Viking Village, the list was never longer than about 15 000 and between 40 to 100 on average. In addition, the heat maps show that there are most often few concentrated areas with very long list lengths while most lists only show low to medium counts. Clearly, the visibility resolution step is dominating the performance, followed by the sorting step, which is between 5 to 10 times faster. Triangle enlargement with fragment list creation, binning, and compaction have a negligible influence on performance.

The measurements also show that working with a low resolution of 400×200 is reasonable. The inventive algorithm guarantees that locations in between samples are also considered for visibility. An increase in resolution yields a quasi linear reduction in performance. However, when lowering the resolution further, performance gets worse, which indicates that 400×200 seems to be the sweet spot for the tested scenes. Obviously, as the camera offset increases, the triangles are enlarged further. Thus, the fragment lists become longer and the algorithm requires more time. However, a doubling in supported camera movement does not lead to a slowdown of two, indicating that the proposed algorithm can scale well to larger camera offsets.

Starting from considerations about under which camera offsets a triangle covers a certain pixel, the invention has introduced the camera offset space (COS). In COS, this coverage is a simple geometric shape. By including a function that describes the depth of the triangle at the sample location for different camera movements, it is possible to determine whether one triangle will be covered by another for various camera offsets. Extending this approach to all samples of a rendered scene and locations in between samples, it was shown that a complete potentially visible set (PVS) can be constructed. As with all PVS algorithms, occluder fusion is of high importance, which is integrated for closed surfaces, for which the connection information from the triangle data is extracted on the fly.

Identifying the potential constellations of occluders and incoming triangles, an efficient algorithm for determining the visibility of a triangle with respect to fused occluders is provided. Implementing the algorithm in a combination of OpenGL and CUDA, the inventions provides nearly real-time rates for the online PVS algorithm. Testing on various scenes indicates that the inventive approach works very reliable and is applicable to the streaming rendering scenario for head-mounted displays.

Overall, the inventive method provides the first PVS algorithm that works on-the-fly and without preprocessing. It does not even require triangle connectivity information or information about which triangles make up an object. As the approach works on a frame-per-frame basis, dynamic objects are naturally supported. All information is computed directly from the triangle input.

We claim:

1. A method for transmitting 3D model data, the 3D model data comprising polygons, from a server to a client for rendering, the method comprising:
obtaining the 3D model data by the server; and
transmitting the 3D model data from the server to the client,
characterized in that
the 3D model data is obtained by the server, based on a given first set of possible camera views (rectangle ($C_A$)),
wherein the step of obtaining the 3D model data further comprises discarding a polygon, if the polygon is not visible under the given first set of possible camera views.

2. The method of claim 1, characterized in that the 3D model data is obtained further based on a current state of the server or the client.

3. The method of claim 2, characterized in that the 3D model data is obtained further based on a current view of a user.

4. The method of claim 3, wherein the possible views include translations of the current view.

5. The method of claim 4, wherein the possible views further include rotations of the current view.

6. The method of claim 1, wherein the 3D model data comprises shading information for the polygons.

7. The method of claim 6, wherein the shading information for the polygons allows the client to render a multitude of views before next shading information is sent.

8. The method of claim 7, wherein the 3D model data is obtained in real time.

9. The method of claim 8, wherein the step of obtaining the 3D model data comprises the step of obtaining a second set of camera views ($Q_A$), for which a given polygon covers a given sample location (s) of a display.

10. The method of claim 9, wherein the camera views are specified in terms of camera view offsets.

11. The method of claim 1, wherein the step of obtaining the 3D model data is implemented on a dedicated graphics processing unit (GPU).

12. A streaming server, adapted to execute a method according to claim 1.

13. A method for rendering 3D model data on a client, comprising:
receiving 3D model data, wherein the 3D model data is obtained and transmitted from a server using the method of claim 1;
determining a current view;
rendering received 3D model data in order to obtain a rendered image, based on the current view; and
displaying the rendered image.

14. The method of claim 13, wherein the current view is determined based on sensor data representing an action by a user.

15. The method of claim 14, wherein the action by the user is a head movement.

16. A streaming client, adapted to execute a method according to claim 13.

17. The streaming client of claim 16, wherein the client is a head mounted display (HMD).

18. The streaming client of claim 16, wherein the client is a tablet or a smartphone.

19. The streaming client of claim 16, wherein the client is a personal computer or a laptop.

20. The streaming client of claim 16, wherein the client comprises a display.

* * * * *